(12) United States Patent
Ho

(10) Patent No.: US 7,604,557 B2
(45) Date of Patent: Oct. 20, 2009

(54) VEHICLE TRANSMISSION

(75) Inventor: Chao-Chang Ho, Feng Shan (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 493 days.

(21) Appl. No.: 11/305,220

(22) Filed: Dec. 19, 2005

(65) Prior Publication Data

US 2007/0142140 A1 Jun. 21, 2007

(51) Int. Cl.
*F16H 55/56* (2006.01)

(52) U.S. Cl. ................................ 474/8; 474/18; 474/28

(58) Field of Classification Search ............... 474/8–28; 123/48 R
See application file for complete search history.

(56) References Cited

U.S. PATENT DOCUMENTS

| | | | | |
|---|---|---|---|---|
| 4,583,423 A * | 4/1986 | Hahne | ........................ | 475/136 |
| 4,834,031 A * | 5/1989 | Katoh et al. | .............. | 123/48 R |
| 4,925,432 A * | 5/1990 | Miyamaru et al. | ............. | 474/8 |
| 5,725,446 A * | 3/1998 | Kaku et al. | .................... | 474/13 |
| 6,565,465 B2 * | 5/2003 | Nishigaya et al. | ............. | 474/28 |
| 7,243,564 B2 * | 7/2007 | Chonan et al. | ................ | 74/329 |
| 7,281,603 B2 * | 10/2007 | Fukuda | ....................... | 180/357 |
| 2001/0044350 A1* | 11/2001 | Nishigaya et al. | ............. | 474/18 |
| 2004/0018903 A1* | 1/2004 | Takagi | ............................ | 474/8 |
| 2004/0077444 A1* | 4/2004 | Kanda et al. | ................... | 474/8 |
| 2004/0089494 A1* | 5/2004 | Fukuda | ....................... | 180/377 |
| 2005/0221927 A1* | 10/2005 | Chonan | ....................... | 474/15 |
| 2006/0063625 A1* | 3/2006 | Emizu et al. | ................ | 474/110 |

\* cited by examiner

*Primary Examiner*—Robert A Siconolfi
*Assistant Examiner*—Robert T Reese
(74) *Attorney, Agent, or Firm*—Banner & Witcoff, Ltd.

(57) ABSTRACT

A vehicle transmission includes a crankshaft box unit, a clutch unit, and a transmission box unit. The crankshaft box unit includes a crankshaft box, a crankshaft extending through the clutch unit and into the transmission box unit, a driven shaft disposed in the transmission box unit and having an end sleeved on a connecting end of the crankshaft, and a bearing disposed between the crankshaft and the driven shaft. The clutch unit includes a seal cover disposed in proximity to the crankshaft box, and a wet clutch disposed between the seal cover and the crankshaft box. The crankshaft extends through the seal cover. The connecting end of the crankshaft is disposed in a transmission box of the transmission box unit.

3 Claims, 3 Drawing Sheets

VEHICLE TRANSMISSION

BACKGROUND OF THE INVENTION

1. Field of the Invention

This invention relates to a vehicle transmission, and more particularly to a vehicle transmission that includes a wet clutch installed on a crankshaft.

2. Description of the Related Art

Referring to FIG. 1, a conventional vehicle transmission 1 is adapted to transmit power from an engine of a vehicle, such as an all-terrain vehicle, a motorcycle, etc., to a rear wheel (not shown) of the vehicle. The conventional vehicle transmission 1 includes a crankshaft box unit 12 driven by the engine, a clutch unit 13 disposed in proximity to the crankshaft box unit 12, and a transmission box unit 14 disposed in proximity to the clutch unit 13.

The crankshaft box unit 12 includes a crankshaft box 125, a crankshaft 121 disposed in the crankshaft box 125 and rotatable by the engine, a driven shaft 122 having two ends connected respectively and pivotally to the crankshaft 121 and a transmission box 140 of the transmission box unit 14, a first bearing 123 disposed between the transmission box 140 and the driven shaft 122, and a self-lubricating bearing 124 sleeved on the driven shaft 122.

The clutch unit 13 includes a seal cover 135 cooperating with the crankshaft box 125 of the crankshaft box unit 12 to define a clutch chamber 130, a wet clutch 131 sleeved on the crankshaft 121 and rotatable with the crankshaft 121, a sleeve body 134 sleeved fixedly on the driven shaft 122, an outer shield 132 connected fixedly to the sleeve body 134 by a plurality of rivets 136 (only two are shown) and disposed around the wet clutch 131, and a second bearing 133 disposed between the sleeve body 134 and the crankshaft 121. The driven shaft 122 extends through the seal cover 135. When the crankshaft 121 rotates, the wet clutch 131 comes into frictional contact with the outer shield 132 so as to allow for co-rotation of the driven shaft 122 and the crankshaft 121.

The transmission box unit 14 includes a driving pulley unit 141 sleeved on the driven shaft 122, a coupling shaft (not shown) connected fixedly to the rear wheel, a driven pulley unit (not shown) sleeved on the coupling shaft, and a V-belt 143 trained on the driving pulley unit 141 and the driven pulley unit so as to transfer rotation of the driving pulley unit 141 to the driven pulley unit. When the driven shaft 122 rotates at a speed smaller than a threshold speed, the pitch diameter of the driving pulley unit 141 is smaller than that of the driven pulley unit. In this state, the rotation speed of the rear wheel is smaller than that of the driven shaft 122. When the driven shaft 122 rotates at a speed greater than the threshold speed, the pitch diameter of the driving pulley unit 141 is greater than that of the driven pulley unit. In this state, the rotation speed of the rear wheel is greater than that of the driven shaft 122.

When the engine is in an idle speed condition, although the crankshaft 121 and the wet clutch 131 rotate, the wet clutch 131 is spaced apart from the outer shield 132. As such, power cannot be transmitted from crankshaft 121 to the driven shaft 122 and, thus, the rear wheel. When a throttle is operated to increase the rotation speed of the crankshaft 121 and the wet clutch 131, the wet clutch 131 engages the outer shield 132 so as to allow for transmission of power from the crankshaft 121 to the driven shaft 122. When the engine is in an acceleration condition, the pitch diameter of the driving pulley unit 141 increases, while the pitch diameter of the driven pulley unit is reduced, thereby resulting in an increase in the rotation speed of the rear wheel. When the engine is in a deceleration condition, the pitch diameter of the driving pulley unit 141 reduces, while the pitch diameter of the driven pulley unit is increased, thereby resulting in a decrease in the rotation speed of the rear wheel.

Since the crankshaft 121 and the driven shaft 122 are coupled to each other at a position between the wet clutch 131 and the outer shield 132, many elements need to cooperate with the crankshaft 121, the driven shaft 122, the wet clutch 131, and the outer shield 132 in a highly precise manner. This results in difficulties with respect to assembly of these elements.

SUMMARY OF THE INVENTION

The object of this invention is to provide a vehicle transmission that can be assembled easily.

According to this invention, a vehicle transmission includes a crankshaft box unit, a clutch unit, and a transmission box unit. The crankshaft box unit includes a crankshaft box, a crankshaft extending through the clutch unit and into the transmission box unit, a driven shaft disposed in the transmission box unit and having an end sleeved coaxially on a connecting end of the crankshaft, and a bearing disposed between the crankshaft and the driven shaft. The clutch unit includes a seal cover disposed in proximity to the crankshaft box, and a wet clutch disposed between the seal cover and the crankshaft box. The crankshaft extends through the seal cover. The connecting end of the crankshaft is disposed in a transmission box of the transmission box unit. As such, the vehicle transmission of this invention can be assembled easily.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 2:
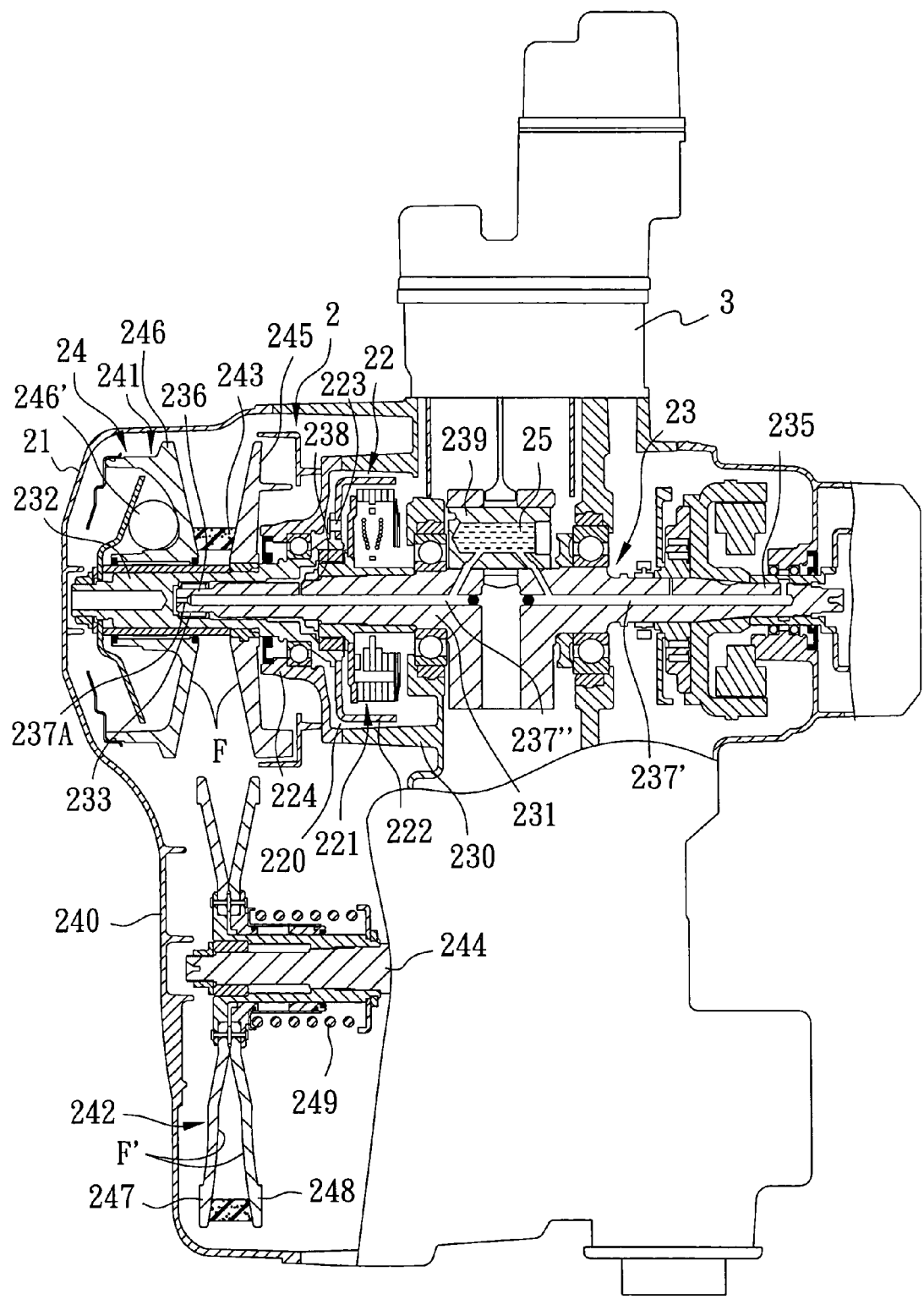
FIG. 2 is a schematic view of the preferred embodiment of a vehicle transmission according to this invention.
Figure 3:
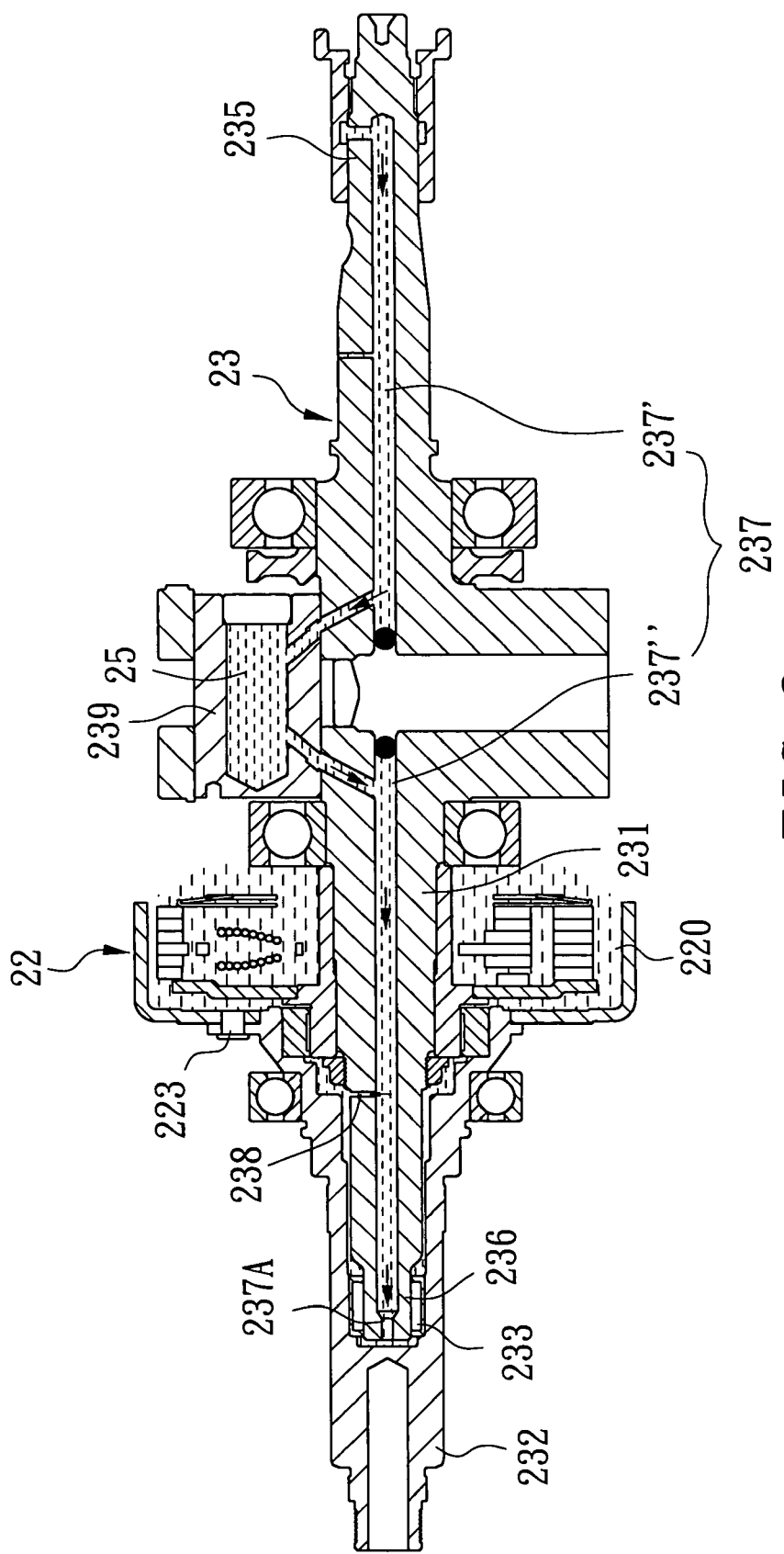
FIG. 3 is a fragmentary sectional view of the preferred embodiment, illustrating flow paths of lubricating oil.

Referring to FIGS. 2 and 3, the preferred embodiment of a vehicle transmission 2 according to this invention is suitable for a scooter, an all-terrain vehicle, etc., and is adapted for transmitting power from an engine 3 to a rear wheel (not shown).

The vehicle transmission 2 includes a clutch unit 22, a crankshaft box unit 23, a transmission box unit 24, and lubricating oil 25 disposed in the clutch unit 22 and the crankshaft box unit 23. Power can be transmitted from the engine 3 to the transmission box unit 24 via the crankshaft box unit 23 and the clutch unit 22 so as to rotate the rear wheel.

The crankshaft box unit 23 includes a crankshaft box 230, a crankshaft 231, a driven shaft 232, and a bearing 233. The crankshaft 231 is journalled within the crankshaft box 230, and is rotatable by the engine 3. The bearing 233 is disposed between the crankshaft 231 and the driven shaft 232 so as to facilitate relative rotation between the crankshaft 231 and the driven shaft 232.

The clutch unit 22 is disposed in proximity to the crankshaft box unit 23, and includes a seal cover 224, a wet clutch 221, and a bowl-shaped outer shield 222. The seal cover 224 cooperates with the crankshaft box 230 to define a clutch chamber 220 therebetween. The wet clutch 221 is disposed within the clutch chamber 220, and is rotatable with the crankshaft 231 in a known manner. The outer shield 222 is disposed in the clutch chamber 220, and has a central portion connected fixedly to the driven shaft 232 by rivets 223 (only one is shown), and an annular outer periphery disposed around the wet clutch 221 in a known manner. When the rotation speed of the crankshaft 231 reaches a predetermined speed, the wet clutch 221 comes into frictional contact with the outer shield 222 in a known manner so as to allow for co-rotation of the crankshaft 231 and the outer shield 222. The bearing 233 is configured as a roller bearing.

The crankshaft 231 extends through the clutch chamber 220 and the seal cover 224, and has an open oil inlet end 235 and an open connecting end 236 that are opposite to each other. The connecting end 236 is disposed in the transmission box unit 24. The driven shaft 232 is disposed in the transmission box unit 24, and has a right end sleeved coaxially on the connecting end 236 of the crankshaft 231.

The crankshaft 231 further has an axial central passage unit 237, a side passage 238, and a hollow conduit member 239. The central passage unit 237 has an upstream passage portion 237' adapted for permitting flow of the lubricating oil 25 therethrough when the lubricating oil 25 is fed into the oil inlet end 235 of the crankshaft 231, and a downstream passage portion 237" spaced apart from and aligned with the upstream passage portion 237'. The conduit member 239 defines an interior chamber communicated with the upstream and downstream passage portions 237', 237" so as to allow for flow of the lubricating oil 25 from the upstream passage portion 237' into the downstream passage portion 237" via the interior chamber in the conduit member 239. The side passage 238 is perpendicular to the upstream and downstream passage portions 237', 237", and has two ends communicated respectively with the downstream passage portion 237" and the clutch chamber 220 so as to allow for flow of the lubricating oil 25 from the downstream passage portion 237" into the clutch chamber 220 via the side passage 238. The downstream passage portion 237" has a bearing-connecting end (237A) that is formed in the connecting end 236 of the crankshaft 231 and that is communicated with the bearing 233. The bearing-connecting end (237A) has a diameter smaller than that of the remaining portion of the downstream passage portion 237" so as to throttle the flow rate of the lubricating oil 25 when flowing from the central passage unit 237 onto the bearing 233. Alternatively, the diameter of the bearing-connecting end (237A) is the same as that of the remaining portion of the downstream passage portion 237", and a throttle valve is disposed within the bearing-connecting end (237A) for performing the same function.

When the lubricating oil 25 is fed into the oil inlet end 235 of the crankshaft 231, it flows from the upstream passage portion 237' of the central passage unit 237 into the downstream passage portion 237" of the central passage unit 237 via the conduit member 239. Subsequently, the lubricating oil 25 flows from the downstream passage portion 237" onto the bearing 233 via the bearing-connecting end (237A), and into the clutch chamber 220 via the side passage 238. Hence, the wet clutch 221 can move within the lubricating oil 25 in the clutch chamber 220.

The transmission box unit 24 is disposed in proximity to the clutch unit 22, and includes a transmission box 240, a driving pulley unit 241, a driven pulley unit 242, a V-belt 243, and a coupling shaft 244. The connecting end 236 of the crankshaft 231 is located in the transmission box 240. A left end of the driven shaft 232 is journalled on a vertical wall of the transmission box 240. The driving pulley unit 241 is disposed in the transmission box 240, and includes a fixed driving pulley half 245 sleeved fixedly on the driven shaft 232 and adjacent to the crankshaft box unit 23, and a movable driving pulley half 246 sleeved movably on the driven shaft 232 and disposed between the fixed driving pulley half 245 and the vertical wall of the transmission box 240 in a known manner. In this embodiment, the crankshaft 231 extends through the fixed driving pulley half 245. When the rotation speed of the driven shaft 232 increases, a ball unit 246' moves outwardly (i.e., away from the driven shaft 232) by centrifugal force so as to move the movable driving pulley half 246 toward the fixed driving pulley half 245 in a known manner. This increases the pitch diameter of the driving pulley unit 241. When the rotation speed of the driven shaft 232 reduces, the movable driving pulley half 246 moves away from the fixed driving pulley half 245. This reduces the pitch diameter of the driving pulley unit 241. The fixed and movable driving pulley halves 245, 246 are formed with juxtaposed frusto-conical surfaces (F) facing each other in a known manner.

Figure 1:
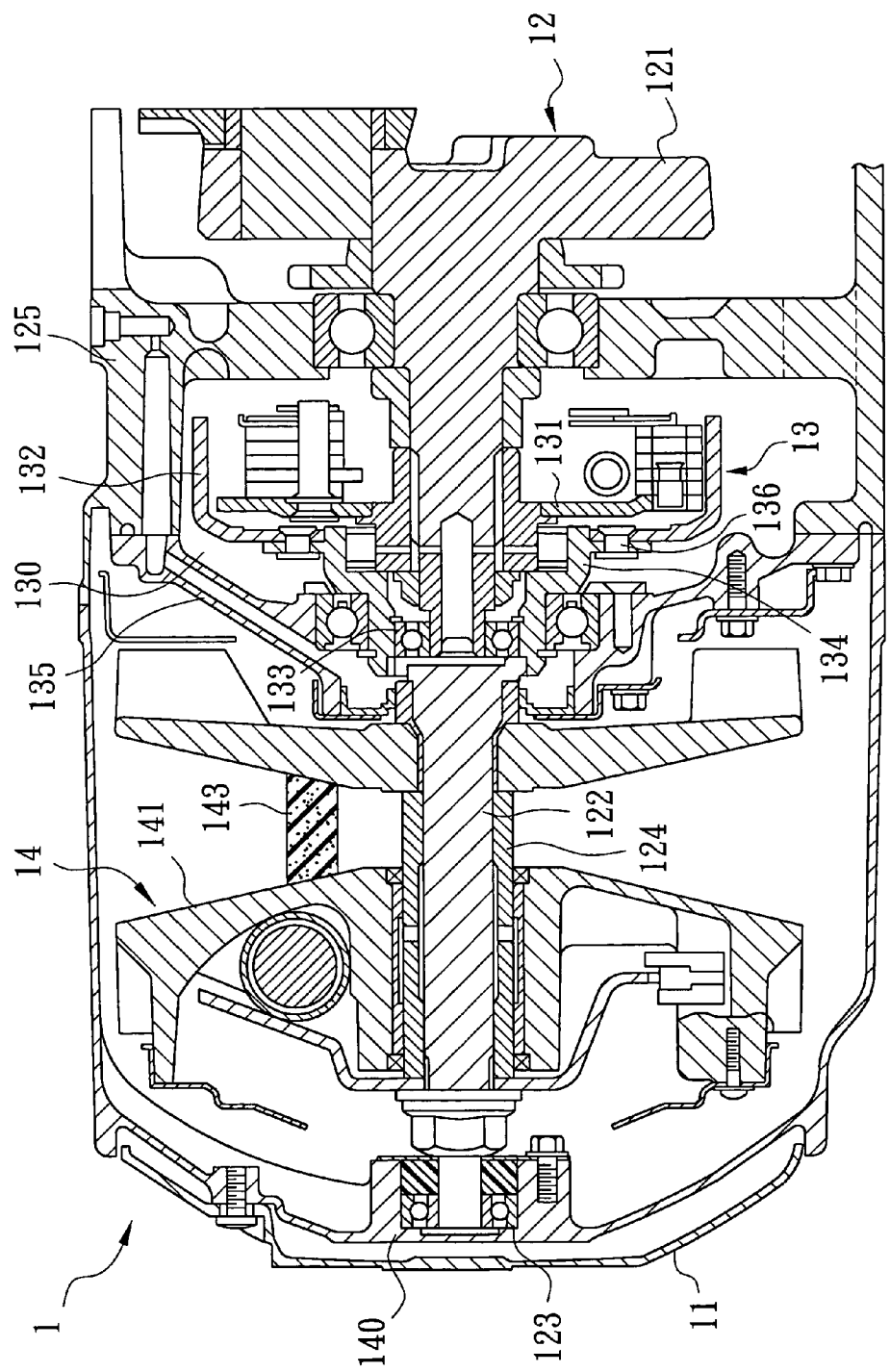
FIG. 1 is a sectional view of a conventional vehicle transmission.

The coupling shaft 244 is journalled in the transmission box 240 under the driven shaft 232, and is connected fixedly to the rear wheel. The driven pulley unit 242 is also disposed in the transmission box 240, and includes a fixed driven pulley half 247 sleeved fixedly on the coupling shaft 244, a movable driven pulley half 248 sleeved movably on the coupling shaft 244, and a coiled compression spring 249 for biasing the movable driven pulley half 248 toward the fixed driven pulley half 247. The fixed and movable driven pulley halves 247, 248 are formed with juxtaposed frusto-conical surfaces (F') facing each other. The V-belt 243 is trained on the driving and driven pulley units 241, 242, and extends between the juxtaposed frusto-conical surfaces (F, F') of the fixed and movable driving pulley halves 245, 246, and the fixed and movable driving pulley halves 247, 248. As such, rotation of the driving pulley unit 241 and the driven shaft 232 can be transferred to the driven pulley unit 242 and the coupling shaft 244. Operation of the transmission box unit 24 is similar to that of the aforesaid conventional vehicle transmission 1 (see FIG. 1), and will not be described in detail.

The vehicle transmission 2 of this invention has the following advantages:

(1) Because the crankshaft 231 extends through the seal cover 224, the connecting end 236 of the crankshaft 231 can be mounted easily to the driven shaft 232. As a consequence, the vehicle transmission 2 can be assembled easily.

(2) The right end of the driven shaft 232 is sleeved coaxially on the connecting end 236 of the crankshaft 231. This facilitates rotation of the crankshaft 231 and the driven shaft 232 about the same rotating axis.

(3) The lubricating oil 25 is fed into the oil inlet end 235 of the central passage 237, and flows in the clutch unit 22 and the crankshaft box unit 23 along the flow paths indicated by the arrows in FIG. 3, thereby effectively lubricating and cooling rotating parts.

With this invention thus explained, it is apparent that numerous modifications and variations can be made without departing from the scope and spirit of this invention. It is therefore intended that this invention be limited only as indicated by the appended claims.

I claim:

1. A vehicle transmission comprising:

a crankshaft box unit including a crankshaft box and a crankshaft journalled within said crankshaft box;

a clutch unit disposed in proximity to said crankshaft box unit and including a seal cover cooperating with said crankshaft box to define a clutch chamber therebetween, and a wet clutch disposed within said clutch chamber and rotatable with said crankshaft, said crankshaft extending through said clutch chamber;

a transmission box unit disposed in proximity to said clutch unit; and lubricating oil disposed in said clutch unit and said crankshaft box unit;

wherein said crankshaft of said crankshaft box unit extends through said seal cover of said clutch unit, and has a connecting end disposed in said transmission box unit, said crankshaft box unit further including a driven shaft disposed in said transmission box unit and having an end sleeved coaxially on said connecting end of said crankshaft, and a bearing disposed between said connecting end of said crankshaft and said driven shaft and in said driven shaft;

wherein said transmission box unit includes:

a transmission box;

a driving pulley unit disposed in said transmission box and rotatable by said crankshaft, said driving pulley unit including a fixed driving pulley half sleeved fixedly on said driving shaft, and a moveable driving pulley half sleeved movably on said driven shaft, said moveable driving pulley half being movable toward said fixed driving pulley half when a rotation speed of said driven shaft increases, said movable driving pulley half being movable away from said fixed driving pulley half when the rotation speed of said driven shaft reduces, said fixed and movable driving pulley halves having juxtaposed frusto-conical surfaces facing each other;

a coupling shaft journalled in said transmission box;

a driven pulley unit disposed in said transmission box and including a fixed driven pulley half sleeved fixedly on said coupling shaft, and a moveable driven pulley half sleeved movably on said coupling shaft, said fixed and movable driven pulley halves having juxtaposed frusto-conical surfaces facing toward each other;

a V-belt trained on said driving and driven pulley units and extending between said juxtaposed frusto-conical surfaces of said fixed and movable driving pulley halves and said fixed and movable driven pulley halves so as to transfer rotation of said driving pulley unit to said driven pulley unit; and a spring for biasing said movable driven pulley half toward said fixed driven pulley half;

wherein said crankshaft of said crankshaft box unit extends through said fixed driving pulley half of said driving pulley unit of said transmission box unit and into said movable driving pulley half of said driving pulley unit of said transmission box unit;

wherein said crankshaft includes:

an axial central passage unit having an upstream passage portion adapted for permitting flow of the lubricating oil therethrough when the lubricating oil is fed into said crankshaft, and a downstream passage portion spaced apart from and aligned with said upstream passage portion and having a bearing-connecting end that is formed in said connecting end of said crankshaft and that is communicated with said bearing of said crankshaft box unit;

a hollow conduit member defining an interior chamber communicated with said upstream and downstream passage portions of said central passage unit so as to allow for flow of the lubricating oil from said upstream passage portion into said downstream passage portion via said interior chamber in said conduit member; and a side passage having two ends communicated respectively with said downstream passage portion of said central passage unit and said clutch chamber so as to allow for flow of the lubricating oil from said downstream passage portion into said clutch chamber via said side passage;

wherein said bearing-connecting end of said downstream passage portion of said central passage unit in said crankshaft has a diameter that is small than that of the remaining portion of said downstream passage portion so as to throttle a flow rate of the lubricating oil when flowing from said central passage unit onto said bearing for lubricating said bearing.

2. The vehicle transmission as claimed in claim 1, wherein said bearing of said crankshaft box unit is configured as a roller bearing.

3. The vehicle transmission as claimed in claim 1, wherein said clutch unit further includes an outer shield disposed in said clutch chamber and having an annular outer periphery disposed around said wet clutch, said outer shield being connected fixedly to said driven shaft.

* * * * *